US009003428B2

(12) United States Patent
Bhogal et al.

(10) Patent No.: US 9,003,428 B2
(45) Date of Patent: *Apr. 7, 2015

(54) COMPUTER DATA COMMUNICATIONS IN A HIGH SPEED, LOW LATENCY DATA COMMUNICATIONS ENVIRONMENT

(71) Applicant: International Business Machines Corporation, Armonk, NY (US)

(72) Inventors: Kulvir S. Bhogal, Pflugerville, TX (US); Paul D. Lewis, Round Rock, TX (US); Foluso O. Okunseinde, Austin, TX (US); Ramanujam Ravisankar, Austin, TX (US); Cornell G. Wright, Jr., Austin, TX (US)

(73) Assignee: International Business Machines Corporation, Armonk, NY (US)

(*) Notice: Subject to any disclaimer, the term of this patent is extended or adjusted under 35 U.S.C. 154(b) by 200 days.

This patent is subject to a terminal disclaimer.

(21) Appl. No.: 13/625,060

(22) Filed: Sep. 24, 2012

(65) Prior Publication Data

US 2013/0024502 A1  Jan. 24, 2013

Related U.S. Application Data

(63) Continuation of application No. 11/426,789, filed on Jun. 27, 2006, now Pat. No. 8,296,778.

(51) Int. Cl.
*G06F 3/00* (2006.01)
*G06F 9/54* (2006.01)
*H04L 29/06* (2006.01)

(52) U.S. Cl.
CPC .............. *G06F 9/546* (2013.01); *H04L 63/08* (2013.01); *G06F 2209/547* (2013.01)

(58) Field of Classification Search
None
See application file for complete search history.

(56) References Cited

U.S. PATENT DOCUMENTS 4,787,035 A   11/1988 Bourne
4,947,429 A   8/1990 Bestler et al.
(Continued)

FOREIGN PATENT DOCUMENTS

CA   2649883   6/2006
CA   2650169   6/2006
(Continued)

OTHER PUBLICATIONS

"CA Application No. 2649883 Office Action", Jul. 24, 2013, 7 pages.
(Continued)

*Primary Examiner* — H S Sough
*Assistant Examiner* — Carina Yun
(74) *Attorney, Agent, or Firm* — DeLizio Gilliam, PLLC

(57) ABSTRACT

A method includes issuing a request, from an application of a contributing client device to a stream administration server, to contribute messages from the application to a feed adapter within a data communication environment via a message stream which bypasses the stream administration server. The feed adapter is coupled to a feed source via a feed adapter input stream and to at least one subscribing device via a feed adapter output stream. The feed source is separate from the contributing client device. The feed adapter input stream is separate from the message stream. The method includes receiving, in response to the request and an authentication of the contributing client device. A set of constraints on messages is to be transmitted from the contributing client device to the feed adapter.

18 Claims, 8 Drawing Sheets

(56) References Cited

U.S. PATENT DOCUMENTS

| | | | |
|---|---|---|---|
| 5,195,092 | A | 3/1993 | Wilson et al. |
| 5,732,274 | A | 3/1998 | O'neill |
| 5,809,028 | A | 9/1998 | Nethercott et al. |
| 5,809,337 | A | 9/1998 | Hannah et al. |
| 5,940,843 | A | 8/1999 | Zucknovich et al. |
| 5,987,432 | A | 11/1999 | Zusman et al. |
| 6,125,391 | A | 9/2000 | Meltzer et al. |
| 6,141,324 | A | 10/2000 | Abbott |
| 6,160,874 | A | 12/2000 | Dickerman et al. |
| 6,343,321 | B2 | 1/2002 | Patki et al. |
| 6,694,316 | B1 | 2/2004 | Langseth et al. |
| 6,725,446 | B1 | 4/2004 | Hahn et al. |
| 6,757,710 | B2 | 6/2004 | Reed |
| 6,901,428 | B1 | 5/2005 | Frazier et al. |
| 6,910,078 | B1 | 6/2005 | Raman et al. |
| 6,954,454 | B1 | 10/2005 | Schuster et al. |
| 7,113,520 | B1 | 9/2006 | Meenan |
| 7,120,165 | B2 | 10/2006 | Kasvand-harris et al. |
| 7,225,195 | B2 | 5/2007 | Avrahami |
| 7,283,904 | B2 | 10/2007 | Benjamin et al. |
| 7,415,715 | B2 | 8/2008 | Fradkov et al. |
| 7,448,043 | B2 | 11/2008 | Shenfield et al. |
| 8,296,778 | B2 | 10/2012 | Bhogal et al. |
| 8,549,168 | B2 | 10/2013 | Borgendale et al. |
| 2001/0016783 | A1 | 8/2001 | Graumann et al. |
| 2001/0049743 | A1 | 12/2001 | Phippen et al. |
| 2002/0019812 | A1 | 2/2002 | Board et al. |
| 2002/0022952 | A1 | 2/2002 | Zager et al. |
| 2002/0023040 | A1 | 2/2002 | Gilman et al. |
| 2002/0083097 | A1 | 6/2002 | Warrington |
| 2002/0086688 | A1 | 7/2002 | Kang |
| 2002/0161900 | A1 | 10/2002 | Brown et al. |
| 2002/0169706 | A1 | 11/2002 | Chandra et al. |
| 2002/0172155 | A1 | 11/2002 | Kasvand-Harris et al. |
| 2003/0073406 | A1 | 4/2003 | Benjamin et al. |
| 2003/0115291 | A1 | 6/2003 | Kendall et al. |
| 2003/0115548 | A1 | 6/2003 | Melgar |
| 2003/0158805 | A1 | 8/2003 | Mozhdehi |
| 2003/0204719 | A1 | 10/2003 | Ben-itzhak |
| 2004/0005744 | A1 | 1/2004 | Taniguchi et al. |
| 2004/0024753 | A1 | 2/2004 | Chane et al. |
| 2004/0024845 | A1 | 2/2004 | Fishhaut et al. |
| 2004/0034591 | A1 | 2/2004 | Waelbroeck et al. |
| 2004/0054744 | A1 | 3/2004 | Karamchedu et al. |
| 2004/0148357 | A1 | 7/2004 | Corrigan |
| 2004/0190459 | A1 | 9/2004 | Ueda et al. |
| 2004/0193703 | A1 | 9/2004 | Loewy et al. |
| 2004/0199524 | A1 | 10/2004 | Rys et al. |
| 2004/0205439 | A1 | 10/2004 | Carmeli et al. |
| 2004/0216135 | A1 | 10/2004 | Heimbeck |
| 2005/0010311 | A1 | 1/2005 | Barbazette et al. |
| 2005/0028195 | A1 | 2/2005 | Feinleib et al. |
| 2005/0028208 | A1 | 2/2005 | Ellis |
| 2005/0044197 | A1 | 2/2005 | Lai |
| 2005/0102218 | A1 | 5/2005 | Sargent et al. |
| 2005/0105533 | A1 | 5/2005 | Malolepsy et al. |
| 2005/0149543 | A1 | 7/2005 | Cohen et al. |
| 2005/0195820 | A1 | 9/2005 | Betts |
| 2005/0222931 | A1 | 10/2005 | Mamou et al. |
| 2005/0246186 | A1 | 11/2005 | Nikolov |
| 2005/0246423 | A1 | 11/2005 | Starbuck et al. |
| 2005/0254508 | A1 | 11/2005 | Aksu et al. |
| 2005/0261923 | A1 | 11/2005 | Brown et al. |
| 2005/0262025 | A1 | 11/2005 | Wajih et al. |
| 2005/0273408 | A1 | 12/2005 | Bandman et al. |
| 2006/0085507 | A1 | 4/2006 | Zhao et al. |
| 2006/0143307 | A1 | 6/2006 | Codignotto |
| 2006/0149840 | A1 | 7/2006 | Thompson et al. |
| 2006/0206440 | A1 | 9/2006 | Anderson et al. |
| 2006/0242240 | A1 | 10/2006 | Parker et al. |
| 2006/0269148 | A1 | 11/2006 | Farber et al. |
| 2007/0038543 | A1 | 2/2007 | Weinstein |
| 2007/0038712 | A1 | 2/2007 | Affronti et al. |
| 2007/0073907 | A1 | 3/2007 | Factor |
| 2007/0091789 | A1 | 4/2007 | Thukral |
| 2007/0106813 | A1 | 5/2007 | Bordes et al. |
| 2007/0150918 | A1 | 6/2007 | Carpenter et al. |
| 2007/0233728 | A1 | 10/2007 | Puteick et al. |
| 2007/0271447 | A1 | 11/2007 | Agarwala et al. |
| 2007/0299936 | A1 | 12/2007 | Borgendale et al. |
| 2007/0299973 | A1 | 12/2007 | Borgendale et al. |
| 2007/0300233 | A1 | 12/2007 | Bhogal et al. |
| 2007/0300234 | A1 | 12/2007 | Dekel et al. |
| 2007/0300235 | A1 | 12/2007 | Dekel et al. |
| 2008/0010487 | A1 | 1/2008 | Dekel et al. |
| 2008/0069141 | A1 | 3/2008 | Bonaguro et al. |
| 2008/0103949 | A1 | 5/2008 | Lobana et al. |
| 2008/0104266 | A1 | 5/2008 | Dekel et al. |
| 2008/0114839 | A1 | 5/2008 | Borgendale |
| 2008/0114938 | A1 | 5/2008 | Borgendale |
| 2008/0137830 | A1 | 6/2008 | Bhogal et al. |
| 2008/0140550 | A1 | 6/2008 | Berezuk et al. |
| 2008/0141272 | A1 | 6/2008 | Borgendale et al. |
| 2008/0141273 | A1 | 6/2008 | Borgendale et al. |
| 2008/0141275 | A1 | 6/2008 | Borgendale et al. |
| 2008/0141276 | A1 | 6/2008 | Borgendale et al. |
| 2008/0243675 | A1 | 10/2008 | Parsons et al. |
| 2008/0244017 | A1 | 10/2008 | Gershinsky et al. |
| 2009/0006559 | A1 | 1/2009 | Bhogal et al. |
| 2009/0006560 | A1 | 1/2009 | Bhogal et al. |
| 2009/0024498 | A1 | 1/2009 | Berezuk et al. |
| 2012/0110372 | A1 | 5/2012 | Borgendale et al. |

FOREIGN PATENT DOCUMENTS

| | | |
|---|---|---|
| EP | 1039410 | 11/2000 |
| JP | 2003163691 | 6/2003 |
| JP | 2004274703 | 9/2004 |
| JP | 2007209040 | 8/2007 |
| JP | 4566273 | 11/2009 |
| JP | 2009542141 | 11/2009 |
| WO | 9900753 | 1/1999 |
| WO | 2005045670 | 5/2005 |
| WO | 2008000625 | 1/2008 |

OTHER PUBLICATIONS

"CA Application No. 2650169 Office Action", Jul. 25, 2013, 8 pages.
"U.S. Appl. No. 11/426,849 Office Action", May 3, 2010, 20 Pages.
Neville, Jennifer et al., "Using Relational Knowledge Discovery to Prevent Securities Fraud", Proceedings of the eleventh ACM SIGKDD international conference on Knowledge discovery in data mining. ACM Press. Aug. 2005, pp. 449-458.
"PCT Search Report and Written Opinion", PCT Application No. PCT/EP2007/063239 Feb. 4, 2008.
"PCT Search Report and Written Opinion", PCT Application No. PCT/EP2007/063194 Jun. 5, 2008.
"PCT Search Report and Written Opinion", PCT Application No. PCT/EP2008/053370 Jul. 7, 2008.
"PCT Search Report and Written Opinion", PCT Application No. PCT/EP2007/055851 Sep. 14, 2007.
"U.S. Appl. No. 11/426,789 Office Action", Mar. 25, 2010.
"U.S. Appl. No. 11/426,764 Office Action", Mar. 6, 2009, 16 pages.
"U.S. Appl. No. 11/426,789 Final Office Action", Mar. 17, 2011, 18 pages.
"U.S. Appl. No. 11/426,789 Office Action", Oct. 6, 2010, 16 pages.
"U.S. Appl. No. 11/426,789 Office Action", Aug. 28, 2009, 17 pages.
"U.S. Appl. No. 11/426,819 Office Action", May 20, 2009, 28 pages.
"U.S. Appl. No. 11/426,849 Office Action", Aug. 17, 2010, 17 pages.
"U.S. Appl. No. 11/426,849 Office Action", Dec. 10, 2009, 18 pages.
"U.S. Appl. No. 11/426,849 Office Action", Jun. 25, 2009, 27 pages.
"U.S. Appl. No. 11/426,857 Office Action", May 27, 2009, 27 pages.
"U.S. Appl. No. 11/426,864 Office Action", Dec. 2, 2009, 29 pages.
"U.S. Appl. No. 11/426,864 Office Action", Jun. 2, 2009, 31 pages.
"U.S. Appl. No. 11/559,425 Office Action", Mar. 19, 2009, 10 pages.
"U.S. Appl. No. 11/559,434 Office Action", May 6, 2009, 19 pages.
"U.S. Appl. No. 11/567,357 Office Action", Oct. 27, 2010, 13 pages.
"U.S. Appl. No. 11/567,357 Office Action", May 27, 2010, 23 pages.
"U.S. Appl. No. 11/567,898 Office Action", Feb. 6, 2009, 10 pages.
"U.S. Appl. No. 11/567,898 Office Action", Aug. 14, 2009, 15 pages.
"U.S. Appl. No. 11/586,076 Office Action", May 8, 2009, 20 pages.

(56) References Cited

OTHER PUBLICATIONS

"U.S. Appl. No. 11/608,904 Office Action", Apr. 6, 2009, 17 pages.
"U.S. Appl. No. 11/609,566 Office Action", Aug. 18, 2009, 27 pages.
"U.S. Appl. No. 11/609,604 Office Action", Apr. 19, 2010, 23 pages.
"U.S. Appl. No. 11/609,604 Office Action", Jan. 22, 2010, 25 pages.
"U.S. Appl. No. 11/609,696 Office Action", Feb. 24, 2009, 9 pages.
"U.S. Appl. No. 11/609,708 Office Action", Sep. 8, 2010, 24 pages.
"U.S. Appl. No. 11/609,708 Office Action", Apr. 19, 2010, 28 pages.
"U.S. Appl. No. 11/728,850 Notice of Allowance", Nov. 22, 2010, 4 pages.
"U.S. Appl. No. 11/728,850 Office Action", Jul. 27, 2010, 17 pages.
"U.S. Appl. No. 11/769,240 Office Action", Jun. 1, 2009, 28 pages.
"U.S. Appl. No. 11/769,243 Office Action", Jun. 22, 2009, 22 pages.
"U.S. Appl. No. 11/780,826 Office Action", Apr. 17, 2009, 16 pages.
"U.S. Appl. No. 11/780,826 Office Action", Oct. 30, 2008, 17 pages.
Newswire, PR, "FirstQuote Provides Financial Information Services for Brokat E-Finance Application", ProQuest Feb. 21, 2000, 3 pages.
Newswire, PR, "PCQuote.com Releases PCQuote Orbit", ProQuest Nov. 2, 1999, 3 pages.
Speakman, T. et al., "PGM Reliable Transport Protocol Specification", RFC 3208 - ; www.faqs.org; RFC 3208; Network Working Group 2001, pp. 1-72.

COMPUTER DATA COMMUNICATIONS IN A HIGH SPEED, LOW LATENCY DATA COMMUNICATIONS ENVIRONMENT

RELATED APPLICATIONS

This application claims the priority benefit of the U.S. application Ser. No. 11/426,789 filed Jun. 27, 2006.

BACKGROUND

The field of the invention is data processing, or, more specifically, methods, apparatus, and products for computer data communications in a high speed, low latency data communications environment.

Messaging environments are generally available to provide data communication between message sending devices and message receiving devices using messages. A message is a quantity of data that includes one or more data fields and is passed from a message producer installed on a message sending device to a message consumer installed on a message receiving device. A message may represent, for example, numeric or textual information, images, encrypted information, and computer program instructions.

A messaging environment may support point-to-point messaging, publish and subscribe messaging, or both. In a point-to-point messaging environment, a message producer may address a message to a single message consumer. In a publish and subscribe messaging environment, a message producer may publish a message to a particular channel or topic and any message consumer that subscribes to that channel or topic receives the message. Because message producers and message consumers communicate indirectly with each other via a channel or topic in a publish and subscribe environment, message transmission is decoupled from message reception. As a consequence, neither producers nor consumers need to maintain state about each other, and dependencies between the interacting participants are reduced or eliminated. A publish and subscribe environment may, therefore, allow message publishers and message subscribers to operate asynchronously.

For further explanation of a messaging environment, FIG. 1 sets forth a block diagram illustrating a typical messaging environment for data communications that includes a message sending device (100), a message receiving device (104), and a message administration server (102). The message sending device (100) is a computer device having installed upon it a message producer (110), a set of computer program instructions configured for transmitting messages to the message administration server (102) for delivery to a message receiving device. In the example of FIG. 1, the message producer (110) transmits messages to the message administration server (102) on a message stream (106). The message sending device (100) may produce the transmitted messages by generating the messages from data of the message sending device itself or data received from some other source. The message receiving device (104) is a computer device having installed upon it a message consumer (112), a set of computer program instructions configured for receiving messages from the message administration server (102). In the example of FIG. 1, the message consumer (112) receives the messages from the message administration server (102) on a message stream (108). In the example of FIG. 1, the message stream (106) and the message stream (108) are data communication channels implemented using, for example, the User Datagram Protocol ('UDP') and the Internet Protocol ('IP').

In either a point-to-point messaging environment or a publish and subscribe messaging environment, the messages transmitted from message sending devices to message receiving devices typically pass through the message administration server (102). The message administration server (102) is computer device having installed upon it a message administration module (114), computer program instructions configured for administering the messages transmitted from the message producer (110) to the message consumer (112). Examples of message administration modules may include the IBM WebSphere®MQ, the Open Message Queue from Sun Microsystems, and the OpenJMS from The OpenJMS Group. In a point-to-point messaging environment, the message administration module (114) provides message queuing for the message consumer (112) as the message administration module (114) receives messages addressed to the consumer (112) from various message providers. In a publish and subscribe messaging environment, the message administration module (114) administers the various channels or topics to which message producers publish and message consumers subscribe. In either message environment, the message administration module (114) may also provide security services to ensure that the only messages arriving at the messaging consumer (112) from the message producer (110) are those messages that the message consumer (112) is authorized to receive and that the message producer (110) is authorized to send.

Current solutions to reduce messaging latency are to remove the message administration server from the messaging environment. In such current solutions, the message sending devices send messages directly to message receiving devices. The drawback to such current solutions is that removing the message administration server removes the administration functionality provided by the message administration server from the messaging environment. Current solutions, therefore, effectively offer no solution in messaging environments where the administrative functions of a message administration server are required. Consider again the financial market data environment example from above. In such an exemplary financial market data environment, consider that a message sending device is only authorized to provide financial quotes on certain financial securities or only authorized to provide financial quotes that are at least fifteen minutes old. Removing the message administration server from such a financial market data environment removes the ability to administer the messages provided by the message sending device to the message receiving device in the financial market data environment.

SUMMARY

In some embodiments, a method includes issuing a request, from an application of a contributing client device to a stream administration server, to contribute messages from the application to a feed adapter within a data communication environment via a message stream which bypasses the stream administration server. The feed adapter is coupled to a feed source via a feed adapter input stream and to at least one subscribing device via a feed adapter output stream. The feed source is separate from the contributing client device. The feed adapter input stream is separate from the message stream. The method includes receiving, in response to the request and an authentication of the contributing client device. A set of constraints on messages is to be transmitted from the contributing client device to the feed adapter, wherein the set of constraints specifies one or more topics of messages that the contributing client device is authorized to contribute to the feed adapter. The method includes establishing the set of constraints in messaging middleware of the contributing client device. The method includes receiving, in the messaging middleware of the contributing client device from the application of the contributing client device, a message for transmission to the feed adapter on the message stream. The method includes determining, by the messaging middleware of the contributing client device, whether contents of the message satisfy the set of constraints. The determining includes comparing a topic associated with the message with the one or more topics of messages that the contributing client device is authorized to contribute to the feed adapter. The determining includes administering the message, by the messaging middleware of the contributing client device, in dependence upon whether the message satisfies the set of constraints.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
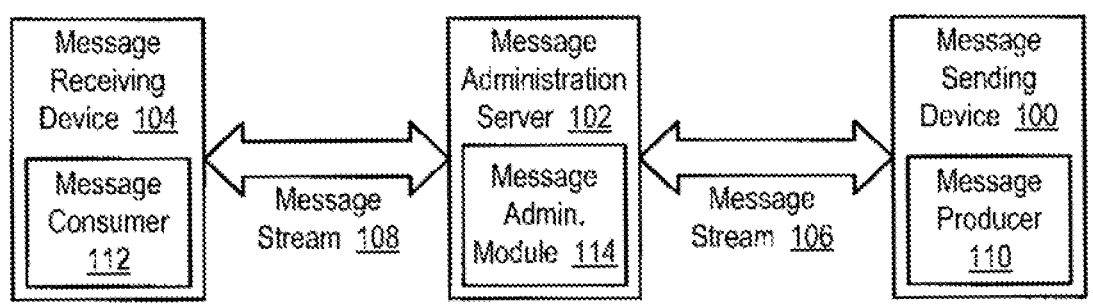
FIG. 1 sets forth a block diagram illustrating a typical messaging environment for data communications.
Figure 2:
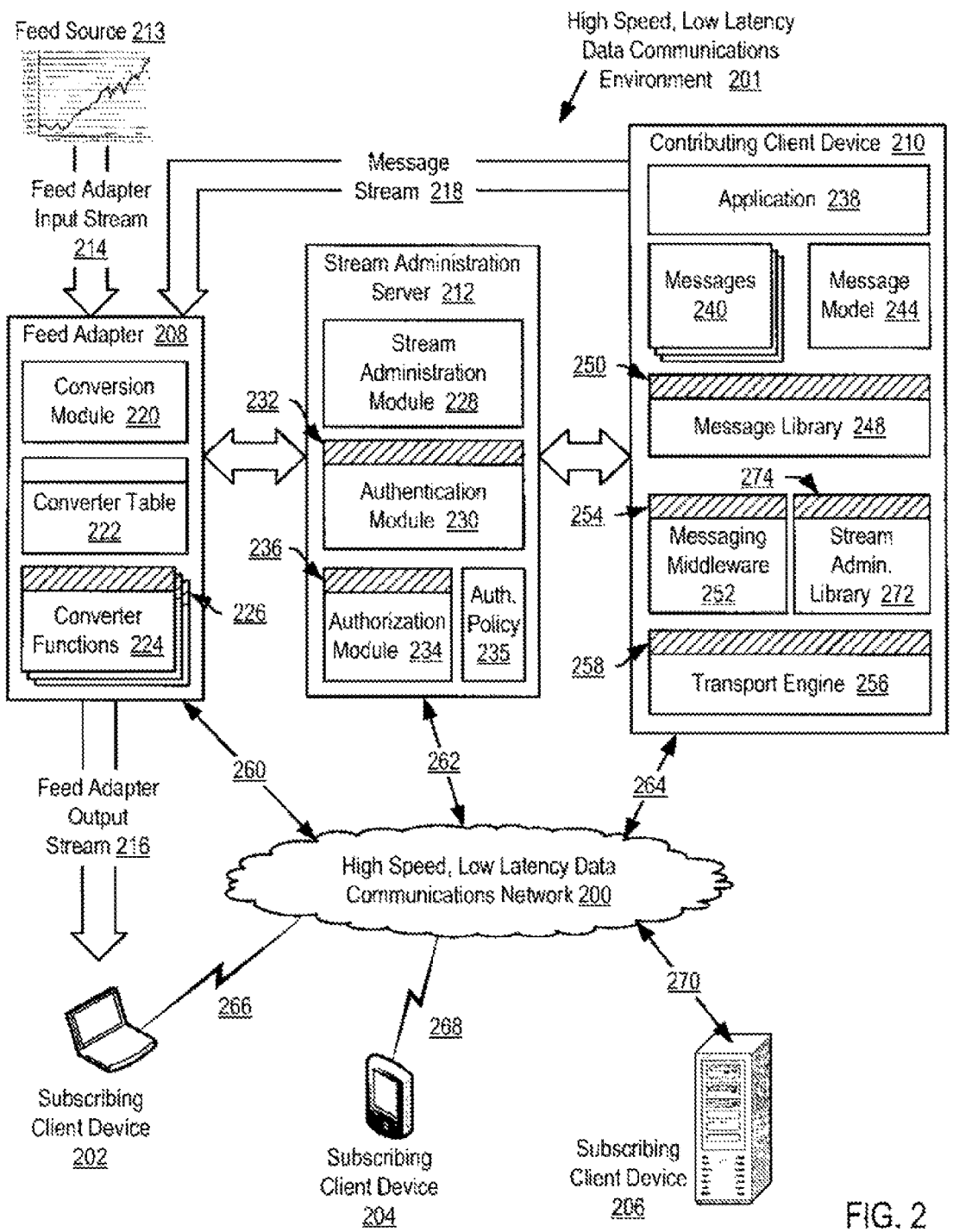
FIG. 2 sets forth a network and block diagram illustrating an exemplary computer data processing system for computer data communications in a high speed, low latency data communications environment according to exemplary embodiments of the present invention.

Exemplary methods, apparatus, and products for computer data communications in a high speed, low latency data communications environment according to embodiments of the present invention are described with reference to the accompanying drawings, beginning with FIG. 2. FIG. 2 sets forth a network and block diagram illustrating an exemplary computer data processing system for computer data communications in a high speed, low latency data communications environment (201) according to embodiments of the present invention. The system of FIG. 2 operates generally for computer data communications in a high speed, low latency data communications environment according to embodiments of the present invention by: brokering, by a stream administration server, establishment of a message stream from a contributing client device to a feed adapter, including authenticating the contributing client device, authorizing the contributing client device to send messages to the feed adapter on the message stream, and establishing in messaging middleware of the contributing client device a set of constraints on messages to be transmitted from the contributing client device to the feed adapter; receiving, in the messaging middleware of the contributing client device from an application of the contributing client device, a message for transmission to the feed adapter on the message stream; determining, by the messaging middleware of the contributing client device, whether contents of the message satisfy the constraints; and administering the message, by the messaging middleware of the contributing client device, in dependence upon whether the message satisfies the constraints.

The high speed, low latency data communications environment (201) illustrated in FIG. 2 includes a high speed, low latency data communications network (200). The network (200) includes a feed adapter (208), a stream administration server (212), several subscribing client devices (202, 204, 206), a contributing client device (210), and the infrastructure for connecting such devices (208, 212, 202, 204, 206, 210) together for data communications. The network (200) of FIG. 2 is termed 'high speed, low latency' because the messages sent between devices connected to the network (200) on message streams administered by the stream administration server (212) bypass the stream administration server (212). For example, the messages on message stream (218) from the contributing client device (210) to the feed adapter (208) bypass the stream administration server (212). Similarly, the messages on the feed adapter out stream (216) from the feed adapter (208) to the subscribing client device (202) bypass the stream administration server (212). Although such messages are not delayed for processing in the stream administration server (212), the stream administration server (212) retains administration of the streams (216, 218) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (208, 212, 202, 204, 206, 210) provides its own routing functionality for data communication through a direct connection with the other devices connected to the network (200). Because the network (200) does not include a computer networking device dedicated to routing data packets, the network (200) of FIG. 2 may be referred to as a 'minimally routed network.' Although the exemplary network (200) illustrated in FIG. 2 does not include a router, such a minimally routed network is for explanation only. In fact, some high speed, low latency networks useful in computer data communications in a high speed, low latency data communications environment according to embodiments of the present invention may include a router.

As mentioned above, the high speed, low latency data communications environment (201) depicted in FIG. 2 includes two message streams (216, 218). A message stream is a data communication channel between a communications endpoint of a sending device and a communications endpoint of at least one receiving device. A communications endpoint is composed of a network address and a port for a sending device or a receiving device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'). In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 2 includes a stream administration server (212) connected to the high speed, low latency data communications network (200) through a wireline connection (262). The stream administration server (212) of FIG. 2 is a computer device having installed upon it a stream administration module (228), an authentication module (230), an authorization module (234), and an authorization policy (235). A stream administration module (228) is a set of computer program instructions configured for computer data communications in a high speed, low latency data communications environment according to embodiments of the present invention. The stream administration module (228) operates generally to administer a message stream according to embodiments of the present invention by brokering establishment of a message stream (218) from a contributing client device (210) to a feed adapter (208), including authenticating the contributing client device (210), authorizing the contributing client device (210) to send messages to the feed adapter (208) on the message stream, and establishing in messaging middleware of the contributing client device (210) a set of constraints on messages to be transmitted from the contributing client device (210) to the feed adapter (208).

The authentication module (230) of FIG. 2 is a set of computer program instructions capable of providing authentication security services to the stream administration module (228) through an exposed authentication application programming interface ('API') (232). Authentication is a process verifying the identity of an entity. In the exemplary system of FIG. 2, the authentication module (230) verifies the identity of the contributing client (210). The authentication module (230) may provide authentication security services using a variety of security infrastructures such as, for example, shared-secret key infrastructure or a public key infrastructure.

The authorization module (234) of FIG. 2 is a set of computer program instructions capable of providing authorization security services to the stream administration module (228) through an exposed authorization API (236). Authorization is a process of only allowing resources to be used by resource consumers that have been granted authority to use the resources. In the example of FIG. 2, the authorization module (234) identifies the messages that the contributing client device (210) is authorized to transmit on the message stream (218). The authorization module (234) of FIG. 2 provides authorization security services using an authorization policy (235). The authorization policy (235) is a set of rules governing the privileges of authenticated entities to send or receive messages on a message stream. In a financial market data environment, for example, an authenticated entity may be authorized to send messages that include financial quotes for some financial securities but not other securities. The authorization policy (235) may grant privileges on the basis of an individual entity or an entity's membership in a group.

In the exemplary system of FIG. 2, feed adapter (208) is connected to the high speed, low latency data communications network (200) through a wireline connection (260). The feed adapter (208) is a computer device having the capabilities of converting messages on a feed adapter input stream (214) having a first format to messages on a feed adapter output stream (216) having a second format and multicasting messages on the feed adapter output stream (216) to subscribing client devices (202, 204, 206). The feed adapter input stream (214) is a message stream from a feed source to the feed adapter (208). The feed adapter output stream (216) is a message stream administered by the stream administration server (212) from a feed adapter (208) to the subscribing client device (202).

In the example of FIG. 2, the feed adapter (208) receives messages on the feed adapter input stream (214) from a feed source (213). The feed source (213) is a computer device capable of aggregating data into messages and transmitting messages to the feed adapter (208). In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Centers.sub.SM which is an electronic screen-based equity securities market in the United States. In a financial market data environment, the feed adapter input stream (214) is referred to as a 'financial market data feed.'

The feed adapter (208) of FIG. 2 has installed upon it a conversion module (220), a converter table (222), and converter functions (224). The conversion module (220) is a set of computer program instructions for converting messages received on the feed adapter input stream (214) having a first format into messages having a second format for transmission to subscribing devices on the feed adapter output stream (216). The conversion module (220) converts messages from the first format to the second format according to the converter table (222).

The converter table (222) of FIG. 2 is a table that specifies the converter functions (224) capable of converting the message from one format to another format. Utilizing multiple converter tables, the conversion module (220) may convert messages from a variety of input formats to a variety of output formats. In the example of FIG. 2, the converter table (222) specifies the converter functions (224) capable of converting the message received from the input stream (214) having the first format to messages having the second format for transmission to subscribing devices on the output stream (216). The converter table (222) of FIG. 2 may be implemented using a structured document such as, for example, an eXtensible Markup Language ('XML') document.

The converter functions (224) of FIG. 2 are functions capable of converting data fields in a message from one format to another format or converting values of data fields from one value to another value. Converter functions (224) may, for example, convert a 16-bit integer to a 32-bit integer, convert a number stored in a string field to a 64-bit double floating point value, increase the value of one data field by one, or any other conversion as will occur to those of skill in the art. The conversion module (220) accesses the converter functions (224) through a set of converter function APIs (226) exposed by the converter functions (224).

As mentioned above, several subscribing client devices (202, 204, 206) are connected to the high speed, low latency data communications network (200) of FIG. 2. The subscribing device (202) connects to the network (200) through a wireline connection (266). The subscribing device (204) connects to the network (200) through a wireless connection (268). The subscribing device (206) connects to the network (200) through a wireline connection (270). Each subscribing client device is a computer device capable of requesting, from the stream administration server (212), a message stream address for receiving messages on a message stream, and receiving the messages on the message stream at the message stream address that the subscribing client device is authorized to receive.

The exemplary system of FIG. 2 includes a contributing client device (210) connected to the high speed, low latency data communications network (200) through a wireline connection (264). The contributing client device (210) of FIG. 2 is a computer device capable of contributing data to the messages transmitted on the output stream (216) of the feed adapter (208). In a financial market data environment, for example, a contributing client device may contribute information to a tick such as, for example, the best bid and ask prices for a particular security, that is not typically included in the ticks provided by the feed source (213). In fact, a contributing client device may be the sole data contributor to a feed adapter, thereby operating as a feed source for the feed adapter. A message stream that provides contributed data from a contributing client device to a feed adapter in a financial market data environment is referred to as a contribution stream for a financial market data feed.

In the example of FIG. 2, the contributing client device (210) has installed upon it an application (238), a message library (248), messaging middleware (252), a stream administration library (272), and a transport engine (256). The application (238) is a software component that aggregates contribution data into messages (240) for transmission to the feed adapter (208). The application (238) may aggregate the contribution data by generating the contributed data itself or receiving the data from another source.

In the example of FIG. 2, the messages (240) have a format specified in a message model (244). The message model (244) is metadata that defines the structure and the format of the messages (240) for transmission on the message stream (218). The message model (244) may be attached to and transmitted along with the messages (240) to the feed adapter (208). More often, however, both the contributing client device (210) and the feed adapter (208) may receive the message model (244) from the stream administration server (212) when the stream administration server (212) brokers the message stream (218). A message model may be implemented using a structured document, such as, for example, an XML document, a Java object, C++ object, or any other implementation as will occur to those of skill in the art.

The application (238) aggregates the contributed data into messages (240) using the message library (248). The message library (248) is a set of functions that are computer program instructions for creating and accessing messages (240) according to a message model (244). The message library (248) is accessible to the application (238) through a message API (250) exposed by the message library (248).

The communications between the contributing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the application (238) of the contributing client device (210) may request to contribute messages to a feed adapter, modify an existing contribution, or cancel a contribution. Functions of the stream administration library (272) used by the application (238) may communicate with the stream administration server (212) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ('IDL'), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java® Remote Method Invocation API is a Java application programming interface for performing remote procedural calls published by Sun Microsystems™. The Java™. RMI API is an object-oriented way of making remote procedure calls between Java objects existing in separate Java Virtual Machines that typically run on separate computers. The Java™. RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, Java RMI allows a Java client to access a remote Java object just like any other local Java object.

When the contributed data is aggregated into messages, the application (238) provides the messages (240) to the messaging middleware (252) for further data processing, the messaging middleware (252) in turn providing the messages (240) to the transport engine (256) for transmission to the feed adapter (208). The messaging middleware (252) is a software component that provides high availability services between the application (238), the feed adapter (208), and any backup feed adapters for the feed adapter (208). In addition, the messaging middleware (252) provides message administration services for the stream administration server (212). Such message administration services may include restricting the ability of the application (238) to send and receive messages on a message stream to messages that satisfy certain constraints. The application (238) and the stream administration library (272) interact with the messaging middleware (252) through a messaging middleware API (254).

In addition to providing high availability and message administration services, the messaging middleware (252) of FIG. 2 also includes a set of computer program instructions capable of computer data communications in a high speed, low latency data communications environment according to embodiments of the present invention. The messaging middleware (252) operates generally for computer data communications in a high speed, low latency data communications environment according to embodiments of the present invention by receiving from the application (238) a message for transmission to the feed adapter (208) on the message stream (218), determining whether contents of the message (240) satisfy constraints established by the stream administration server (212), and administering the message in dependence upon whether the message satisfies the constraints. The application (238) interacts with the messaging middleware (252) through a messaging middleware API (254) exposed by the messaging middleware (252).

The transport engine (256) of FIG. 2 is a software component operating in the transport and network layers of the OSI protocol stack promulgated by the International Organization for Standardization. The transport engine (256) provides data communications services between network-connected devices. The transport engine may be implemented according to the UDP/IP protocols, TCP/IP protocols, or any other data communications protocols as will occur to those of skill in the art. The transport engine (256) includes a set of computer program instructions for encapsulating the messages provided by the messaging middleware (252) into packets, transmitting the packets through the message stream (218) to the feed adapter (208), receiving packets through the message stream (218) from the feed adapter (208), unencapsulating the messages from the received packets, and providing the messages to the messaging middleware (252). The messaging middleware (252) operates the transport engine (256) through a transport API (258) exposed by the transport engine (256).

The servers and other devices illustrated in the exemplary system of FIG. 2 are for explanation, not for limitation. Devices useful in computer data communications in a high speed, low latency data communications environment may be implemented using general-purpose computers, such as, for example, computer servers or workstations, hand-held computer devices, such as, for example, PDAs or mobile phones, or any other automated computing machinery configured for data processing according to embodiments of the present invention as will occur to those of skill in the art.

The arrangement of servers and other devices making up the exemplary system illustrated in FIG. 2 are for explanation, not for limitation. Data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 2.

Providing computer data communications in a high speed, low latency data communications environment in accordance with the present invention in some embodiments may be implemented with one or more contributing client devices, stream administration servers, and feed adapters, that is, automated computing machinery. For further explanation, therefore, FIG. 3 sets forth a block diagram of automated computing machinery comprising an example of a contributing client device (210) useful in providing computer data communications in a high speed, low latency data communications environment according to embodiments of the present invention. The contributing client device (210) of FIG. 3 includes at least one computer processor (156) or 'CPU' as well as random access memory (168) ('RAM') which is connected through a high speed memory bus (166) and bus adapter (158) to processor (156) and to other components of the contributing client device.

Stored in RAM (168) is an application (238), messages (240), message model (244), a message library (248), a messaging middleware (252) a stream administration library (272), and a transport engine (256). Each message (240) is a quantity of data that includes one or more data fields and is transmitted from one device to another on a message stream. As mentioned above, a message may represent numeric or textual information, images, encrypted information, computer program instructions, and so on. In a financial market data environment, for example, a message is commonly referred to as a 'tick' and represents financial market data such as, for example, financial quotes or financial news. Each message (240) may be implemented using a structured document such as, for example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The application (238), the message library (248), the messaging middleware (252), the stream administration library (272), and the transport engine (256) illustrated in FIG. 3 are software components, that is computer program instructions, that operate as described above with reference to FIG. 2.

Also stored in RAM (168) is an operating system (154). Operating systems useful in contributing client devices according to embodiments of the present invention include UNIX™, Linux™, Microsoft NT™, IBM's AIX™, IBM's i5/OS™, and others as will occur to those of skill in the art. The operating system (154), the application (238), the messages (240), the message model (244), the message library (248), the messaging middleware (252), and the transport engine (256) in the example of FIG. 3 are shown in RAM (168), but many components of such software typically are stored in non-volatile memory also, for example, on a disk drive (170).

Figure 3:
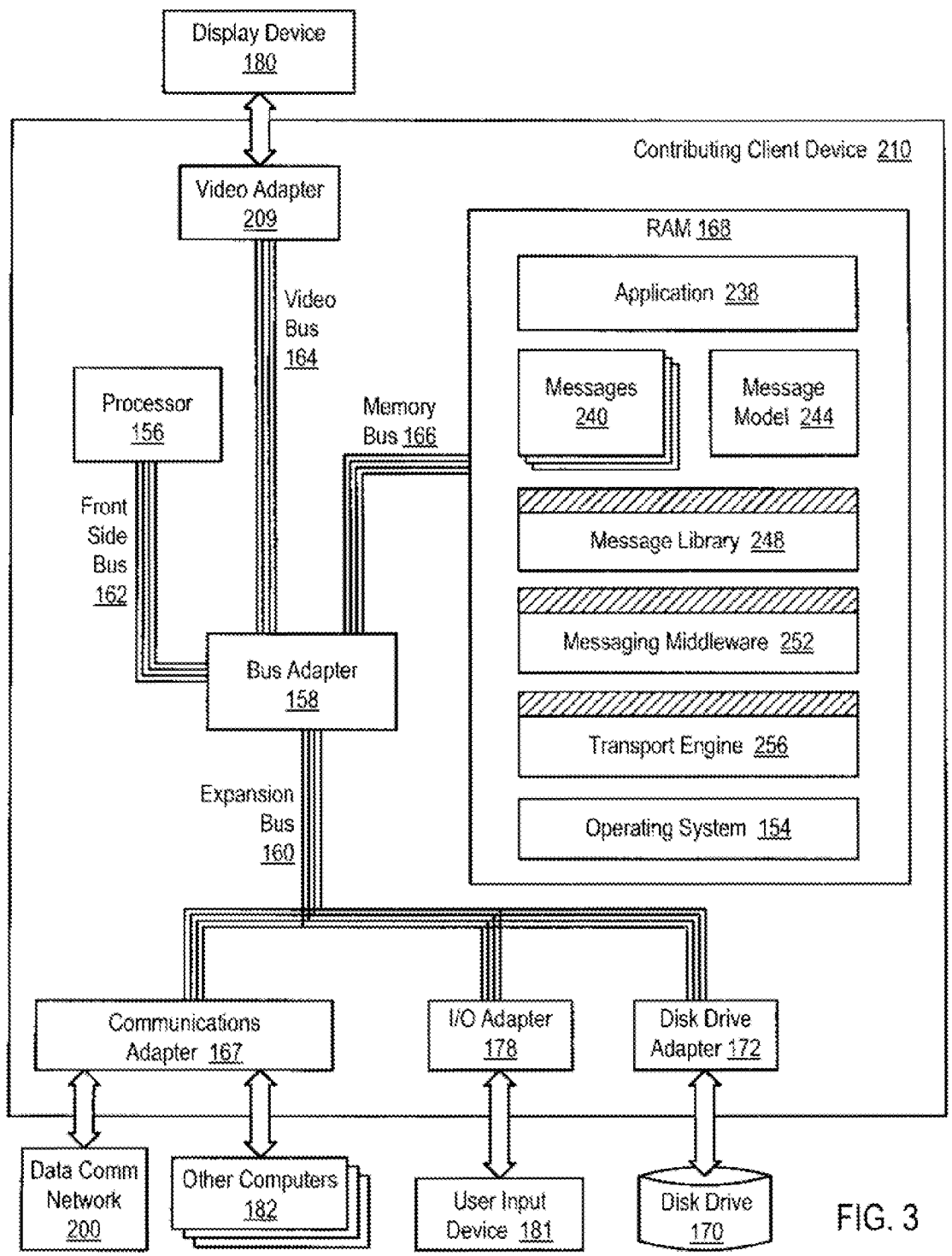
FIG. 3 sets forth a block diagram of automated computing machinery comprising an example of a contributing client device useful in providing computer data communications in a high speed, low latency data communications environment according to exemplary embodiments of the present invention.

The exemplary contributing client device (210) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in contributing client devices useful according to embodiments of the present invention include the Intel Northbridge, the Intel Memory Controller Hub, the Intel Southbridge, and the Intel I/O Controller Hub. Examples of expansion buses useful in contributing client devices useful according to embodiments of the present invention may include Peripheral Component Interconnect ('PCI') buses and PCI Express ('PCIe') buses.

The exemplary contributing client device (210) of FIG. 3 also includes disk drive adapter (172) coupled through expansion bus (160) and bus adapter (158) to processor (156) and other components of the exemplary contributing client device (210). Disk drive adapter (172) connects non-volatile data storage to the exemplary contributing client device (210) in the form of disk drive (170). Disk drive adapters useful in contributing client devices include Integrated Drive Electronics ('IDE') adapters, Small Computer System Interface ('SCSI') adapters, and others as will occur to those of skill in the art. In addition, non-volatile computer memory may be implemented for a contributing client device as an optical disk drive, electrically erasable programmable read-only memory (so-called 'EEPROM' or 'Flash' memory), RAM drives, and so on, as will occur to those of skill in the art.

The exemplary contributing client device (210) of FIG. 3 includes one or more input/output ('I/O') adapters (178). I/O adapters in contributing client devices implement user-oriented input/output through, for example, software drivers and computer hardware for controlling output to display devices such as computer display screens, as well as user input from user input devices (181) such as keyboards and mice. The exemplary contributing client device (210) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary contributing client device (210) of FIG. 3 includes a communications adapter (167) for data communications with other computers (182) and for data communications with a high speed, low latency data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing computer data communications in a high speed, low latency data communications environment according to embodiments of the present invention include modems for wired dial-up communications, IEEE 802.3 Ethernet adapters for wired data communications network communications, and IEEE 802.11b adapters for wireless data communications network communications.

Although FIG. 3 is discussed with reference to exemplary contributing client devices, readers will note that automated computing machinery comprising exemplary stream administration servers and exemplary feed adapters useful in providing computer data communications in a high speed, low latency data communications environment according to embodiments of the present invention are similar to the exemplary contributing client device (210) of FIG. 3. That is, such exemplary stream administration servers and feed adapters include one or more processors, bus adapters, buses, RAM, video adapters, communications adapters, I/O adapters, disk drive adapters, and other components similar to the exemplary contributing client device (210) of FIG. 3 as will occur to those of skill in the art.

Figure 4:
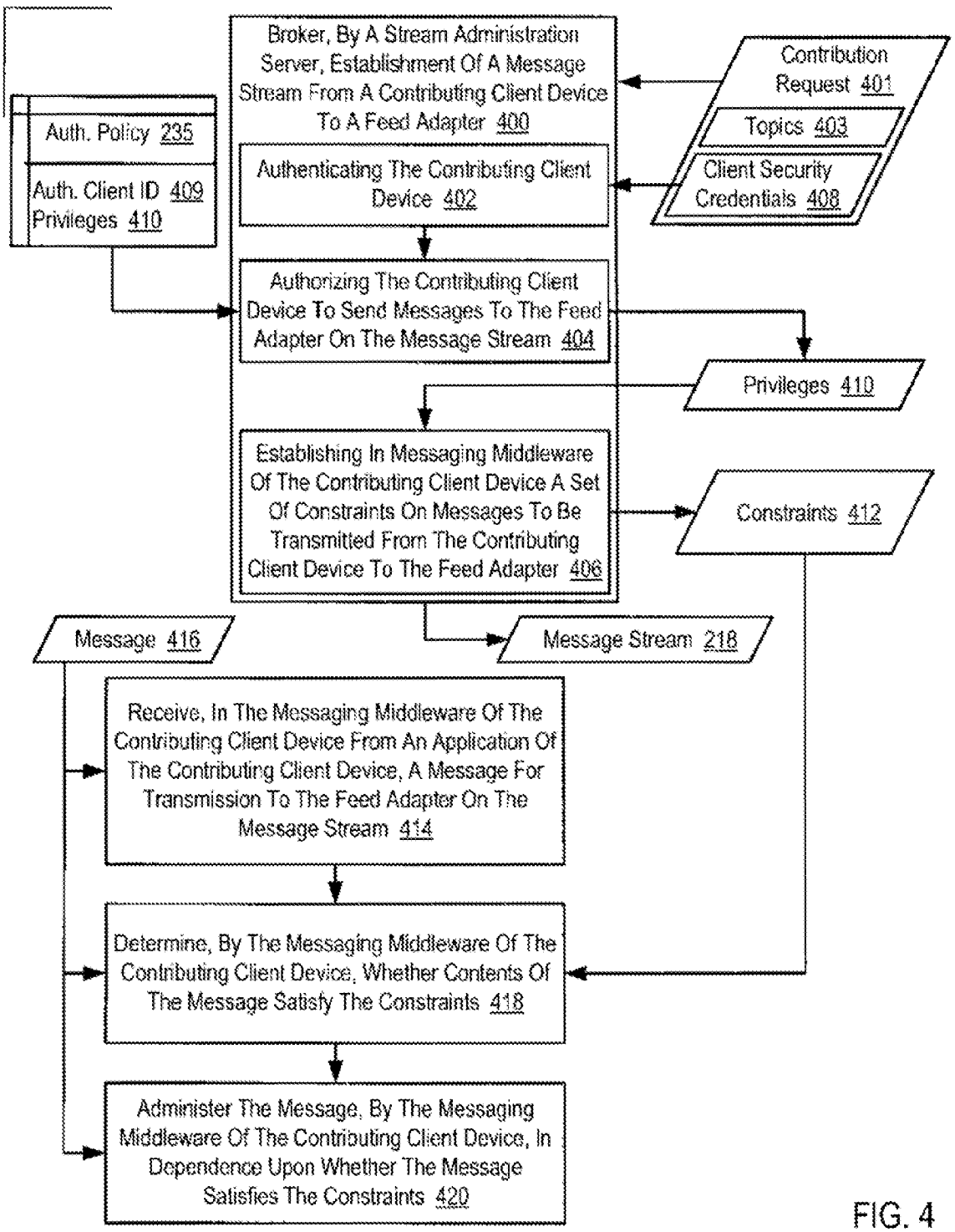
FIG. 4 sets forth a flowchart illustrating an exemplary method for computer data communications in a high speed, low latency data communications environment according to exemplary embodiments of the present invention.

For further explanation, FIG. 4 sets forth a flowchart illustrating an exemplary method for computer data communications in a high speed, low latency data communications environment according to embodiments of the present invention. The method of FIG. 4 includes brokering (400), by a stream administration server, establishment of a message stream (218) from a contributing client device to a feed adapter. The message stream (218) represents a data communication channel between a communications endpoint of a contributing client device and a communications endpoint of a feed adapter. A message stream may be implemented as a multicast data communication channel using the UDP/IP protocols or a unicast data communication channel using TCP/IP protocols as discussed above with reference to FIG. 2.

Brokering (400), by a stream administration server, establishment of a message stream (218) from a contributing client device to a feed adapter according to the method of FIG. 4 may be carried out by receiving a contribution request (401) from a contributing client device to contribute messages to a feed adapter. The contribution request (401) is a request by an application of a contributing client device to contribute data to a feed adapter. The contribution request (401) of FIG. 4 may be implemented as an XML document, a call to a member method of a RMI object on the contributing client device, or any other implementation as will occur to those of skill in the art.

The contribution request (401) of FIG. 4 includes the topics (403) of the messages that the contributing client device requests to contribute to the feed adapter. A topic represents the characteristics of the messages that the contributing client device requests to contribute. Using a topic, a contributing client device may specify the group of messages that the contributing client device requests to contribute to a feed adapter. In a financial market data environment, for example, a contributing client device may use a topic to request to contribute ticks from an OPRA feed source that contains quotes of an IBM option traded on the Chicago Board Options Exchange ('CBOE') that includes the best bid and best ask for the IBM option on the CBOE.

Brokering (400), by a stream administration server, establishment of a message stream (218) from a contributing client device to a feed adapter according to the method of FIG. 4 may also be carried out by providing the contributing client device a destination address for the feed adapter. The destination address for the feed adapter is a multicast address or a unicast address used by the feed adapter to listen for messages. Using the destination address provided by the stream administration server, the contributing client device may establish the message stream (218) from the contributing client device to the feed adapter.

Before the stream administration server provides the destination address for the feed adapter, the stream administration server in the example of FIG. 4 performs several security services to ensure that the contributing client device only contributes messages to the feed adapter for which the contributing client is authorized to contribute. In the method of FIG. 4, brokering (400), by a stream administration server, establishment of a message stream (218) from a contributing client device to a feed adapter includes authenticating (402) the contributing client device. Authenticating (402) the contributing client device may be carried out by verifying client security credentials (408) provided by the contributing client device with the contribution request (401). The client security credentials (408) may be implemented as a digital signature in a public key infrastructure, a security token, or any other security data as will occur to those of skill in the art for authenticating the identity of the originator of the contribution request (401). Examples of security token may include those security tokens described in the web services specification entitled 'Web Services Security' ('WS-Security') developed by IBM, Microsoft, and VeriSign or the web services specification entitled 'Web Services Trust Language' ('WS-Trust') developed by IBM, Microsoft, VeriSign, Open-Networks, Layer 7, Computer Associates, BEA, Oblix, Reactivity, RSA Security, Ping Identity, and Actional.

In the method of FIG. 4, brokering (400), by a stream administration server, establishment of a message stream (218) from a contributing client device to a feed adapter also includes authorizing (404) the contributing client device to send messages to the feed adapter on the message stream (218). Authorizing (404) the contributing client device to send messages to the feed adapter on the message stream (218) according to the method of FIG. 4 may be carried out by identifying the privileges (410) associated with the authenticated contributing client device in dependence upon an authorization policy (235). The authorization policy (235) is a set of rules governing the privileges of authenticated contributing client devices requesting to contribute data to a feed adapter. In the example of FIG. 4, the authorization policy (235) associates privileges (410) with authenticated contributing client device identifier (409). The authenticated contributing client device identifier (409) represents a contributing client device authenticated by a stream administration server. The privileges (410) represent the set of messages permissible for an authenticated contributing client device identified by the associated authenticated contributing client device identifier (409) to contribute to a feed adapter. Different authenticated contributing client devices may have difference privileges. Although the authorization policy (430) depicted in FIG. 4 associates individual authenticated users with certain privileges, such a depiction is for explanation and not for limitation. The authorization policy (235) may, in fact, grant privileges on the basis of a contributing client device's membership in a group or on any other basis as will occur to those of skill in the art.

Brokering (400), by a stream administration server, establishment of a message stream (218) from a contributing client device to a feed adapter according to the method of FIG. 4 also includes establishing (406) in messaging middleware of the contributing client device a set of constraints (412) on messages to be transmitted from the contributing client device to the feed adapter. Constraints (412) specify the topics of the messages which a contributing client device is authorized to contribute to a feed adapter. In a financial market data environment, for example, constraints may specify that a particular authenticated contributing client device is authorized to send ticks from an OPRA feed source that contains quotes of an IBM option traded on the Chicago Board Options Exchange ('CBOE') that includes the best bid and best ask for the IBM option on the CBOE. Establishing (406) in messaging middleware of the contributing client device a set of constraints (412) on messages to be transmitted from the contributing client device to the feed adapter may be carried out by returning the constraints (412) to the messaging middleware of a contributing client device in response to a function call by messaging middleware that provided a contribution request (401).

The method of FIG. 4 also includes receiving (414), in the messaging middleware of the contributing client device from an application of the contributing client device, a message (416) for transmission to the feed adapter on the message stream (218). The message (416) represents a quantity of data that includes one or more data fields such as, for example, numeric or textual information, images, encrypted information, computer program instructions, and so on. The message (416) is capable of being passed from a contributing client device to a feed adapter. As mentioned above, in a financial market data environment, a message is commonly referred to as a 'tick' and represents financial market data such as, for example, financial quotes or financial news. Receiving (414), in the messaging middleware of the contributing client device from an application of the contributing client device, a message (416) for transmission to the feed adapter on the message stream (218) according to the method of Figure may be carried out by receiving a pointer in computer memory to the message (416) in response to the application of the contributing client device invoking a function exposed by a messaging middleware API.

The method of FIG. 4 also includes determining (418), by the messaging middleware of the contributing client device, whether contents of the message (416) satisfy the constraints (412). Determining (418), by the messaging middleware of the contributing client device, whether contents of the message (416) satisfy the constraints (412) may be carried out by applying a constraint operator to a constraint value and to a value from a data field in the message (416) identified by a message field identifier as discussed below with reference to FIG. 7.

The method of FIG. 4 also includes administering (420) the message (416), by the messaging middleware of the contributing client device, in dependence upon whether the message (416) satisfies the constraints (412). Administering (420) the message (416), by the messaging middleware of the contributing client device, in dependence upon whether the message (416) satisfies the constraints (412) may be carried out by authorizing transmission of the message (416) on the stream in dependence upon whether the message satisfies the constraints (412) and logging the message (416) in dependence upon whether the message (416) satisfies the constraints (412) as discussed below with reference to FIGS. 5 and 6.

Figure 5:
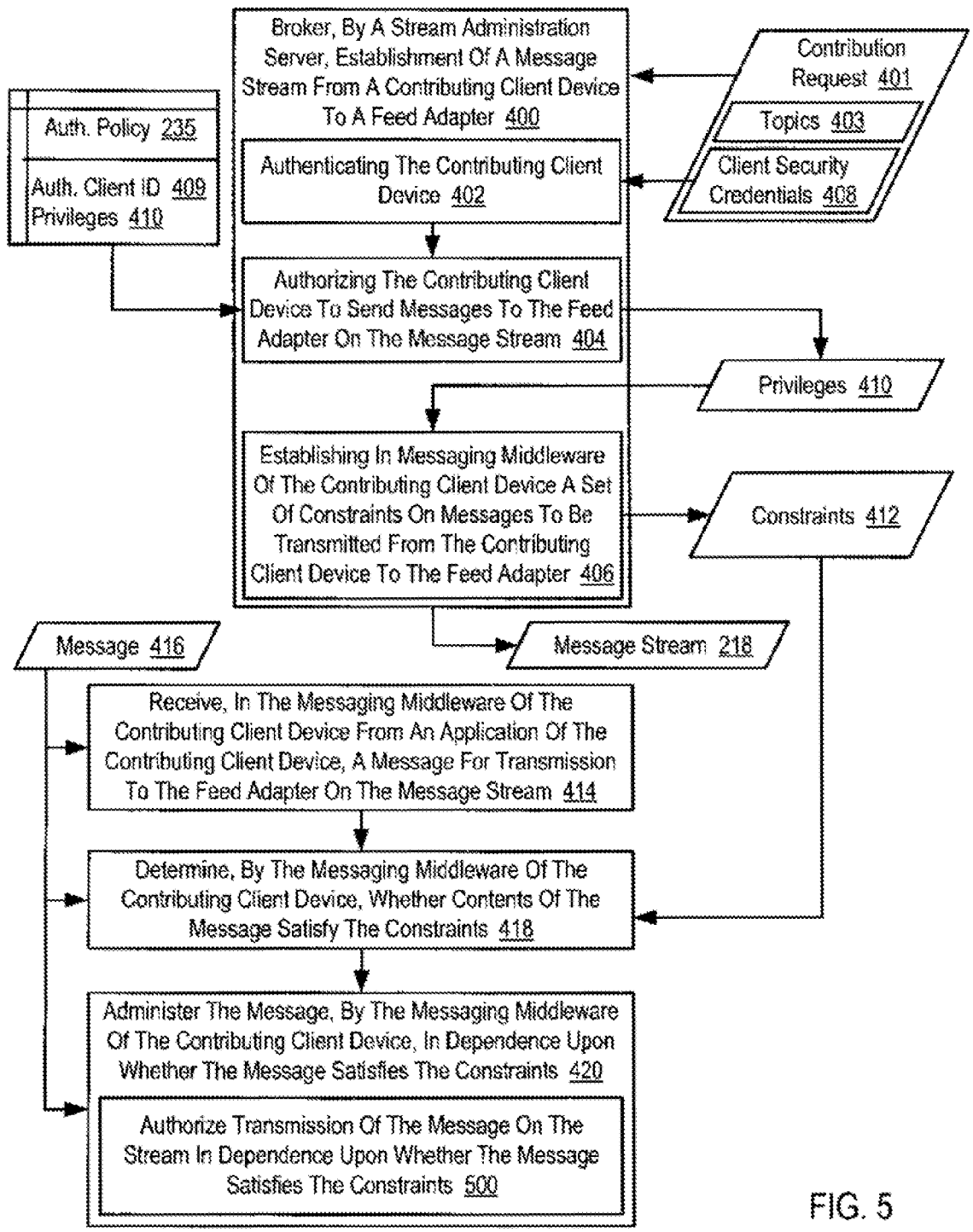
FIG. 5 sets forth a flowchart illustrating a further exemplary method for computer data communications in a high speed, low latency data communications environment according to exemplary embodiments of the present invention.

For further explanation, FIG. 5 sets forth a flowchart illustrating a further exemplary method for computer data communications in a high speed, low latency data communications environment according to embodiments of the present invention in which administering (420) the message (416), by the messaging middleware of the contributing client device, in dependence upon whether the message (416) satisfies the constraints (412) includes authorizing (500) transmission of the message (416) on the stream in dependence upon whether the message satisfies the constraints (412).

The method of FIG. 5 is similar to the method of FIG. 4 in that the method of FIG. 5 includes brokering (400), by a stream administration server, establishment of a message stream from a contributing client device to a feed adapter, authenticating (402) the contributing client device, authorizing (404) the contributing client device to send messages to the feed adapter on the message stream, establishing (406) in messaging middleware of the contributing client device a set of constraints (412) on messages to be transmitted from the contributing client device to the feed adapter, receiving (414), in the messaging middleware of the contributing client device from an application of the contributing client device, a message (416) for transmission to the feed adapter on the message stream, determining (418), by the messaging middleware of the contributing client device, whether contents of the message satisfy the constraints, and administering (420) the message, by the messaging middleware of the contributing client device, in dependence upon whether the message satisfies the constraints. The example of FIG. 5 is also similar to the example of FIG. 4 in that the example of FIG. 5 includes contribution request (401), topics (403), client security credentials (408), authentication policy (235), authentication client identifier (409), privileges (410), constraints (412), message (416), and message stream (218).

In the method of FIG. 5, authorizing (500) transmission of the message (416) on the stream (218) in dependence upon whether the message satisfies the constraints (412) may be carried out by providing, by the messaging middleware of the contributing client device to a transport engine of the contributing client device, the message (416) for transmission to the feed adapter if the message (416) satisfies the constraints (412). Authorizing (500) transmission of the message (416) on the stream (218) in dependence upon whether the message satisfies the constraints (412) according to the method of FIG. 5 may also be carried out by discarding, by messaging middleware of the contributing client device, the message (416) if the message (416) does not satisfies the constraints (412). Readers will note, however, that discarding the message (416) if the message (416) does not satisfies the constraints (412) is for explanation and not for limitation. In fact, the authorizing (500) transmission of the message (416) on the stream (218) in dependence upon whether the message satisfies the constraints (412) may also be carried out by providing, by the messaging middleware of the contributing client device to a transport engine of the contributing client device, the message (416) for transmission to some entity other than the feed adapter if the message (416) does not satisfies the constraints (412).

As mentioned above, administering a message, by the messaging middleware of the contributing client device, in dependence upon whether the message satisfies the constraints may be carried out by logging the message in dependence upon whether the message satisfies the constraints. For further explanation, therefore, FIG. 6 sets forth a flowchart illustrating a further exemplary method for computer data communications in a high speed, low latency data communications environment according to embodiments of the present invention that includes logging (600) the message (416) in dependence upon whether the message (416) satisfies the constraints (412).

Figure 6:
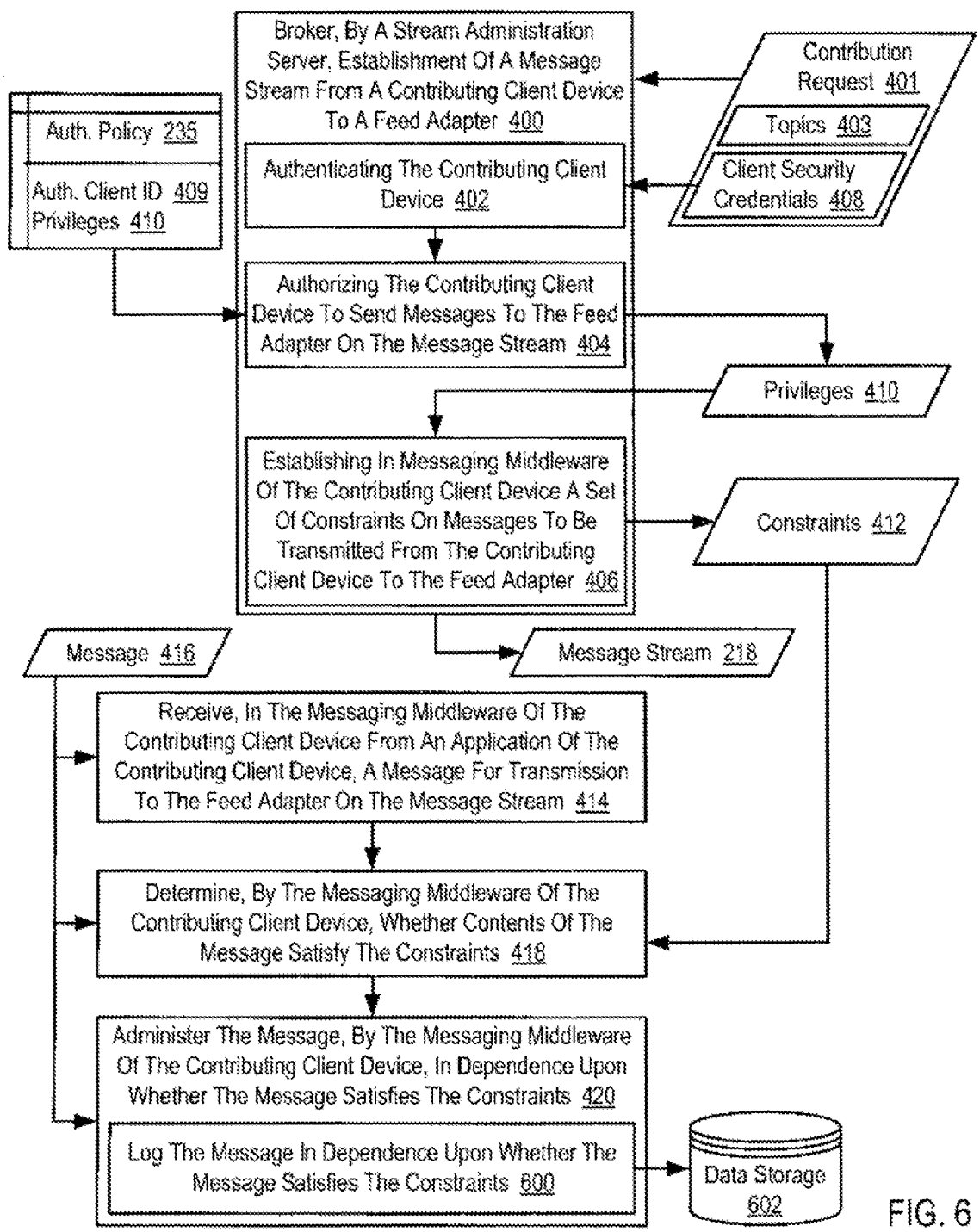
FIG. 6 sets forth a flowchart illustrating a further exemplary method for computer data communications in a high speed, low latency data communications environment according to exemplary embodiments of the present invention.

The method of FIG. 6 is similar to the method of FIG. 4 in that the method of FIG. 6 includes brokering (400), by a stream administration server, establishment of a message stream from a contributing client device to a feed adapter, authenticating (402) the contributing client device, authorizing (404) the contributing client device to send messages to the feed adapter on the message stream, establishing (406) in messaging middleware of the contributing client device a set of constraints (412) on messages to be transmitted from the contributing client device to the feed adapter, receiving (414), in the messaging middleware of the contributing client device from an application of the contributing client device, a message (416) for transmission to the feed adapter on the message stream, determining (418), by the messaging middleware of the contributing client device, whether contents of the message satisfy the constraints, and administering (420) the message, by the messaging middleware of the contributing client device, in dependence upon whether the message satisfies the constraints. The example of FIG. 6 is also similar to the example of FIG. 4 in that the example of FIG. 6 includes contribution request (401), topics (403), client security credentials (408), authentication policy (235), authentication client identifier (409), privileges (410), constraints (412), message (416), and message stream (218).

The method of FIG. 6 differs from the method of FIG. 4 in that administering (420) the message, by the messaging middleware of the contributing client device, in dependence upon whether the message (416) satisfies the constraints (412) according to the method of FIG. 6 includes logging (600) the message (416) in dependence upon whether the message (416) satisfies the constraints (412). Logging (600) the message (416) in dependence upon whether the message (416) satisfies the constraints (412) according to the method of FIG. 6 may be carried out by storing in data storage (602) data describing the message (416) such as, for example, a message identifier, a timestamp associated with the message (416), the topic of the message (416), and so on. Logging (600) the message (416) in dependence upon whether the message (416) satisfies the constraints (412) according to the method of FIG. 6 may be carried out by storing the message (416) itself in data storage (602). Data storage (602) is non-volatile computer storage of the contributing client device or some other device connected to the contributing client device such as, for example, a database server. Logging (600) the message (416) in dependence upon whether the message (416) satisfies the constraints (412) advantageously provides the capability of later analysis of the messages or data describing messages stored in data storage (602).

As mentioned above, determining, by the messaging middleware of the contributing client device, whether contents of the message satisfy the constraints may be carried out by applying a constraint operator to a constraint value and to a value from a data field in the message identified by a message field identifier. For further explanation, therefore, FIG. 7 sets forth a flowchart illustrating a further exemplary method for computer data communications in a high speed, low latency data communications environment according to embodiments of the present invention that includes applying (706) the constraint operator (704) to the constraint value (702) and to a value from a data field in the message (416) identified by the message field identifier (701).

Figure 7:
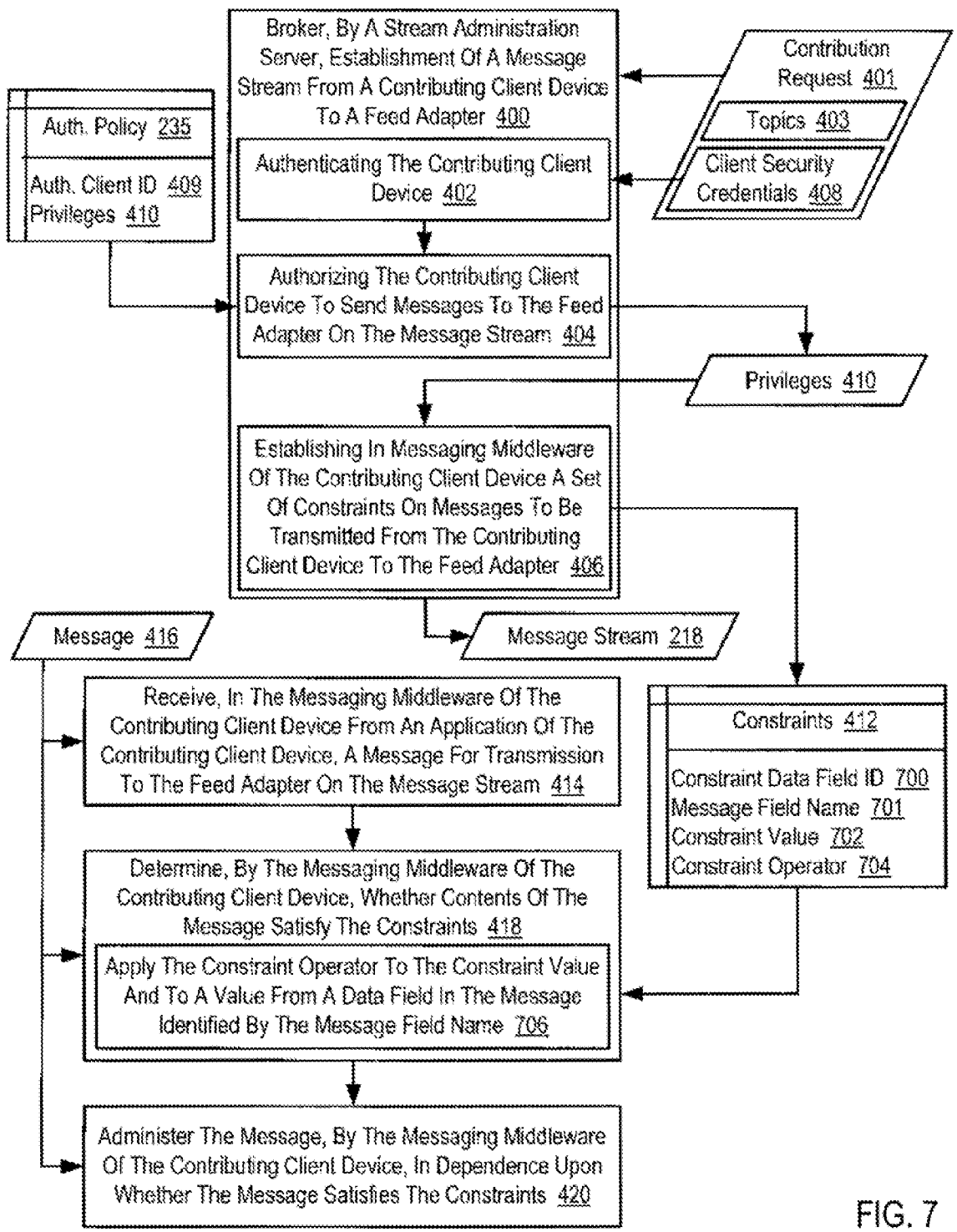
FIG. 7 sets forth a flowchart illustrating a further exemplary method for computer data communications in a high speed, low latency data communications environment according to exemplary embodiments of the present invention.

The method of FIG. 7 is similar to the method of FIG. 4 in that the method of FIG. 7 includes brokering (400), by a stream administration server, establishment of a message stream from a contributing client device to a feed adapter, authenticating (402) the contributing client device, authorizing (404) the contributing client device to send messages to the feed adapter on the message stream, establishing (406) in messaging middleware of the contributing client device a set of constraints (412) on messages to be transmitted from the contributing client device to the feed adapter, receiving (414), in the messaging middleware of the contributing client device from an application of the contributing client device, a message (416) for transmission to the feed adapter on the message stream, determining (418), by the messaging middleware of the contributing client device, whether contents of the message satisfy the constraints, and administering (420) the message, by the messaging middleware of the contributing client device, in dependence upon whether the message satisfies the constraints. The example of FIG. 7 is also similar to the example of FIG. 4 in that the example of FIG. 7 includes contribution request (401), topics (403), client security credentials (408), authentication policy (235), authentication client identifier (409), privileges (410), constraints (412), message (416), and message stream (218).

The method of FIG. 7 differs from the method of FIG. 4 in that determining (418), by the messaging middleware of the contributing client device, whether contents of the message (416) satisfy the constraints (412) according to the method of FIG. 7 includes applying (706) the constraint operator (704) to the constraint value (702) and to a value from a data field in the message (416) identified by the message field identifier (701). In the example of FIG. 7, the constraints (412) include one or more constraint data fields. The constraints (412) of FIG. 7 are represented as a table where each record in the table represents a constraint and where each constraint is identified by a constraint identifier (700). Each constraint is characterized by a message field identifier (701), a constraint value (702), and a constraint operator (704). The message field identifier (701) identifies a data field in the message (416). The constraint value (702) specifies a value to compare with a value in the message (416) for determining whether the message (412) satisfies a particular constraint data field. Consider, for example, the following exemplary table of constraints in a financial market data environment:

| Constraint Identifier (700) | Message Field Identifier (701) | Constraint Operator (704) | Constraint Value (702) |
|---|---|---|---|
| 1 | Tick_Feed | "=" | "OPRA" |
| 2 | Tick_Context | "=" | "TOP" |
| 3 | Tick_Product | "BEGINS WITH" | "IBM" |

Readers will note that the exemplary table of constraints (412) above is for explanation and not for limitation. The message field identifier (701) may specify the data field in the message (416) using text as shown above or using numeric values that correspond to particular fields in the message (416). The constraint operator (704) may specify simple operators such as, for example, '=', '>', or '<', or specify more complex operator such as, for example, 'CONTAINS,' 'DOES NOT EQUAL,' 'ENDS WITH,' and so on. In addition, constraints (412) useful for computer data communications in a high speed, low latency data communications environment according to embodiments of the present invention may be implemented using data structures as will occur to those of skill in the art other than the exemplary table above.

In the method of FIG. 7, applying (706) the constraint operator (704) to the constraint value (702) and to a value from a data field in the message (416) identified by the message field identifier (701) may be carried out by retrieving, by the messaging middleware, the value from a data field in the message (416) identified by the message field identifier (701). Messaging middleware may retrieve the value from a data field in the message (416) identified by the message field identifier (701) by reading the value directly from the message (416) using a message model that describes the location of the message field identified by the message field identifier (701). Rather than reading the value directly from the message, messaging middleware may also retrieve the value from a data field in the message (416) identified by the message field identifier (701) by passing the message (416) and the message field name (701) to a function of the messaging library of the contributing client device and receiving, in return, the value from the data field in the message (416) identified by the message field identifier (701).

Applying (706) the constraint operator (704) to the constraint value (702) and to a value from a data field in the message (416) identified by the message field identifier (701) according to the method of FIG. 7 may further be carried out by comparing, for each constraint identifier (700), the value from the data field in the message (416) identified by the message field identifier (701) to the constraint value (702) in dependence upon the constraint operator (704). If, for each constraint identifier (700), the value from the data field in the message (416) identified by the message field identifier (701) and the constraint value (702) satisfy the constraint operator (704), then the message (412) satisfies the constraints (412). If, for each constraint identifier (700), the value from the data field in the message (416) identified by the message field identifier (701) and the constraint value (702) do not satisfy the constraint operator (704), then the message (412) does not satisfy the constraints (412).

Continuing with the above exemplary table of constraints in a financial market data environment, consider an exemplary tick that contains a value of 'OPRA' for the tick data field identified by 'Tick_Feed,' a value of 'TOP' for the tick data field identified by 'Tick Context,' and a value of 'IBM GP-E/CBOE' for the tick data field identified by 'Tick_Product.' Comparing, for each constraint identifier (700) in the exemplary table above, the value from the data field in the message (416) identified by the message field identifier (701) to the constraint value (702) in dependence upon the constraint operator (704) indicates that the exemplary tick satisfies the constraints in the exemplary table of constraints above.

As mentioned above, the messaging middleware of a contributing client device uses constraints to administer the messages received from an application of the contributing client device. A stream administration server may set values of the constraints that prevent the message from being sent on the message stream. For further explanation, therefore, FIG. 8 sets forth a flowchart illustrating a further exemplary method for computer data communications in a high speed, low latency data communications environment according to embodiments of the present invention that includes setting (800), by the stream administration server, values of constraints (412) in the messaging middleware of the contributing client device that prevent the message (416) from being sent on the message stream (218).

Figure 8:
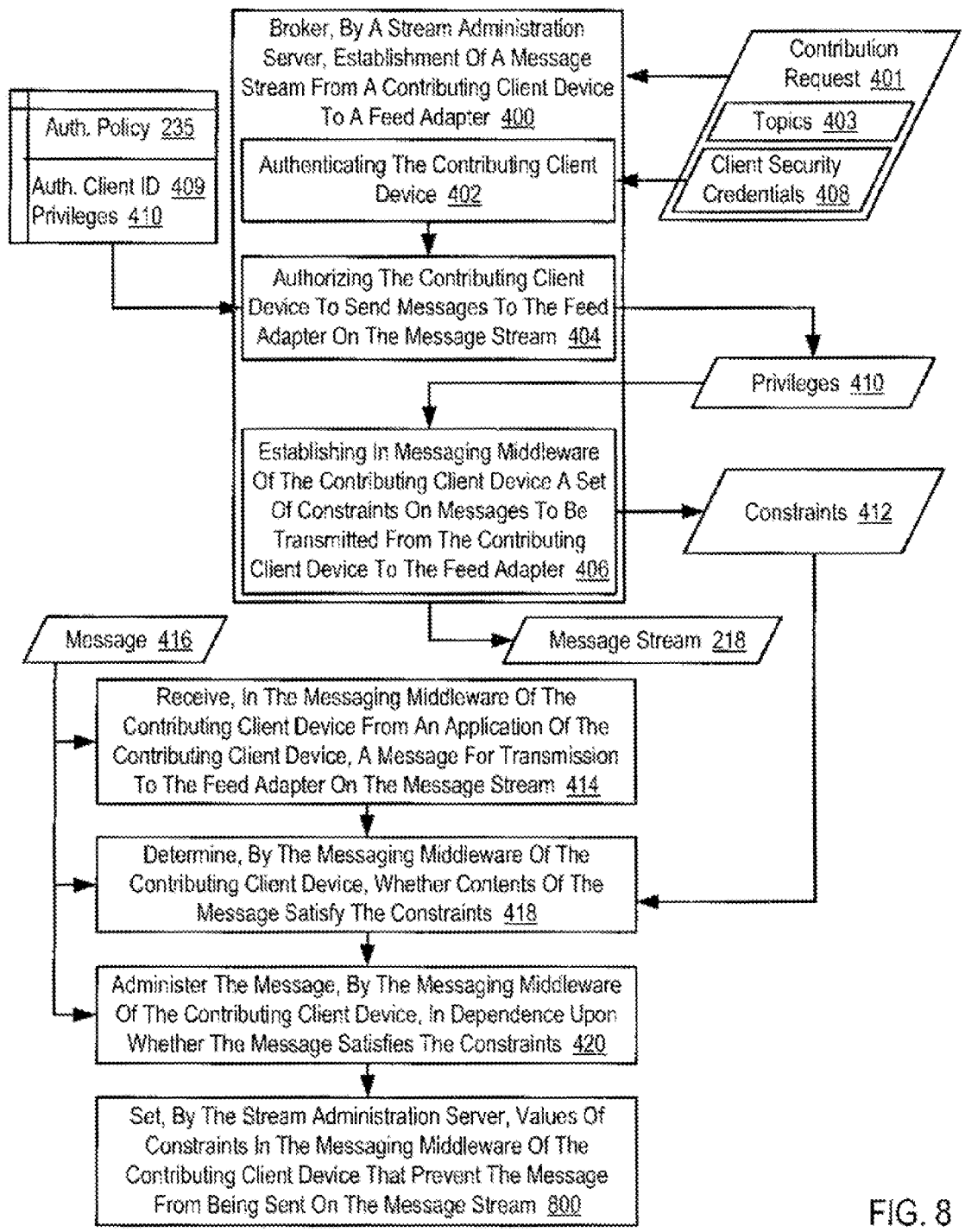
FIG. 8 sets forth a flowchart illustrating a further exemplary method for computer data communications in a high speed, low latency data communications environment according to exemplary embodiments of the present invention.

The method of FIG. 8 is similar to the method of FIG. 4 in that the method of FIG. 8 includes brokering (400), by a stream administration server, establishment of a message stream from a contributing client device to a feed adapter, authenticating (402) the contributing client device, authorizing (404) the contributing client device to send messages to the feed adapter on the message stream, establishing (406) in messaging middleware of the contributing client device a set of constraints (412) on messages to be transmitted from the contributing client device to the feed adapter, receiving (414), in the messaging middleware of the contributing client device from an application of the contributing client device, a message (416) for transmission to the feed adapter on the message stream, determining (418), by the messaging middleware of the contributing client device, whether contents of the message satisfy the constraints, and administering (420) the message, by the messaging middleware of the contributing client device, in dependence upon whether the message satisfies the constraints. The example of FIG. 8 is also similar to the example of FIG. 4 in that the example of FIG. 8 includes contribution request (401), topics (403), client security credentials (408), authentication policy (235), authentication client identifier (409), privileges (410), constraints (412), message (416), and message stream (218).

The method of FIG. 8 differs from the method of FIG. 4 in that the method of FIG. 8 also includes setting (800), by the stream administration server, values of constraints (412) in the messaging middleware of the contributing client device that prevent the message from being sent on the message stream (218). Setting (800), by the stream administration server, values of constraints (412) in the messaging middleware of the contributing client device that prevent the message from being sent on the message stream (218) according to the method of FIG. 8 may be carried out by setting values for constraints that no message (416) received in the messaging middleware of the contributing client device from an application of the contributing client device will satisfy. Consider, for example, the exemplary table of constraints in a financial market data environment discussed above with reference to FIG. 7. Setting values for constraints that no message (416) will satisfy may be carried out by setting the constraint value associated with the message field identifier having a value of 'Tick_Product' to a value of 'NULL.' Because the value of the 'Tick_Product' message field will never contain a value of 'NULL,' no tick satisfies the exemplary constraint-effectively preventing the message (416) from being sent on the message stream (218). Setting (800), by the stream administration server, values of constraints (412) in the messaging middleware of the contributing client device that prevent the message from being sent on the message stream (218), therefore, advantageously provides a mechanism for the stream administration server to prevent messages from being sent on the stream while the application of the contributing client device continues to provides messages to the messaging middleware of the contributing client device for transmission to the feed adapter.

Exemplary embodiments of the present invention are described largely in the context of a fully functional computer system for computer data communications in a high speed, low latency data communications environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
issuing a request, from an application of a contributing client device to a stream administration server, to contribute messages from the application to a feed adapter within a data communication environment via a message stream which bypasses the stream administration server, wherein,
the feed adapter is coupled to a feed source via a feed adapter input stream and to at least one subscribing device via a feed adapter output stream,
the feed source is separate from the contributing client device, and
the feed adapter input stream is separate from the message stream;
receiving, in response to the request and an authentication of the contributing client device,
a set of constraints on messages to be transmitted from the contributing client device to the feed adapter, wherein the set of constraints specifies one or more topics of messages that the contributing client device is authorized to contribute to the feed adapter;
establishing the set of constraints in a messaging middleware of the contributing client device;
receiving, in the messaging middleware of the contributing client device from the application of the contributing client device, a message for transmission to the feed adapter on the message stream;
determining, by the messaging middleware of the contributing client device, whether contents of the message satisfy the set of constraints, wherein the determining comprises
comparing a topic associated with the message with the one or more topics of messages that the contributing client device is authorized to contribute to the feed adapter; and
administering the message, by the messaging middleware of the contributing client device, in dependence upon whether the message satisfies the set of constraints.

2. The method of claim 1 wherein the data communications environment comprises a data communications network, the network further comprising the feed adapter, the stream administration server, the at least one subscribing client device, the contributing client device, and no router.

3. The method of claim 1 wherein
the feed adapter comprises a conversion module to convert messages having a first format received via the feed adapter input stream to messages having a second format for transmission on the feed adapter output stream to the at least one subscribing client device.

4. The method of claim 1 wherein administering the message further comprises
authorizing transmission of the message on the message stream in dependence upon whether the message satisfies the set of constraints; and
transmitting the message from the contributing client device to the feed adapter, bypassing the stream administration server, in response to an authorization of transmission of the message on the message stream.

5. The method of claim 1 wherein administering the message further comprises logging the message in dependence upon whether the message satisfies the set of constraints.

6. The method of claim 1 further comprising setting, by the stream administration server, values of constraints in the messaging middleware of the contributing client device that prevent the message from being sent on the message stream.

7. The method of claim 1 wherein:
each constraint of the set of constraints is characterized by a message field identifier, a constraint value, and a constraint operator; and
determining, by the messaging middleware, whether contents of the message satisfy the set of constraints further comprises applying the constraint operator to the constraint value and to a value from a data field in the message identified by the message field identifier.

8. An apparatus for computer data communications in a data communications environment, the apparatus comprising:

one or more computer processors;
one or more computer memories operatively coupled to the one or more computer processors, the computer memories configured to store computer program instructions configured to:
issue a request, from an application of a contributing client device to a stream administration server, to contribute messages from the application to a feed adapter within a data communication environment via a message stream which bypasses the stream administration server, wherein,
the feed adapter is coupled to a feed source via a feed adapter input stream and to at least one subscribing device via a feed adapter output stream,
the feed source is separate from the contributing client device, and
the feed adapter input stream is separate from the message stream;
receive, in response to the request and an authentication of the contributing client device,
a set of constraints on messages to be transmitted from the contributing client device to the feed adapter, wherein the set of constraints specifies one or more topics of messages that the contributing client device is authorized to contribute to the feed adapter;
establish the set of constraints in a messaging middleware of the contributing client device;
receive, in the messaging middleware of the contributing client device from the application of the contributing client device, a message for transmission to the feed adapter on the message stream;
determine, by the messaging middleware of the contributing client device, whether contents of the message satisfy the set of constraints, wherein the determine comprises:
compare a topic associated with the message with the one or more topics of messages that the contributing client device is authorized to contribute to the feed adapter; and
administer the message, by the messaging middleware of the contributing client device, in dependence upon whether the message satisfies the set of constraints.

9. The apparatus of claim 8 wherein the data communications environment comprises a data communications network, the network further comprising the feed adapter, the stream administration server, the at least one subscribing client device, the contributing client device, and no router.

10. The apparatus of claim 8 wherein
the feed adapter comprises a conversion module to convert messages having a first format received via a feed adapter input stream to messages having a second format for transmission on the feed adapter output stream to the at least one subscribing client device.

11. The apparatus of claim 8 wherein the computer program instructions configured to administer the message comprises computer program instructions configured to:
authorize transmission of the message on the message stream in dependence upon whether the message satisfies the set of constraints; and
transmit the message from the contributing client device to the feed adapter, bypassing the stream administration server, in response to an authorization of transmission of the message on the message stream.

12. The apparatus of claim 8 wherein the computer program instructions configured to administer the message comprises computer program instructions configured to log the message in dependence upon whether the message satisfies the set of constraints.

13. The apparatus of claim 8 wherein:
each constraint of the set of constraints is characterized by a message field identifier, a constraint value, and a constraint operator; and
wherein the computer program instructions are configured to determine, by the messaging middleware, whether contents of the message satisfy the constraints further comprises applying the constraint operator to the constraint value and to a value from a data field in the message identified by the message field identifier.

14. A computer program product for computer data communications in a data communications environment, the computer program product disposed upon a non-transitory machine-readable storage recordable medium, the computer program product comprising computer program instructions configured to:
issue a request, from an application of a contributing client device to a stream administration server, to contribute messages from the application to a feed adapter within a data communication environment via a message stream which bypasses the stream administration server, wherein,
the feed adapter is coupled to a feed source via a feed adapter input stream and to at least one subscribing device via a feed adapter output stream,
the feed source is separate from the contributing client device, and
the feed adapter input stream is separate from the message stream;
receive, in response to the request and an authentication of the contributing client device,
a set of constraints on messages to be transmitted from the contributing client device to the feed adapter, wherein the set of constraints specifies one or more topics of messages that the contributing client device is authorized to contribute to the feed adapter;
establish the set of constraints in a messaging middleware of the contributing client device;
receive, in the messaging middleware of the contributing client device from the application of the contributing client device, a message for transmission to the feed adapter on the message stream;
determine, by the messaging middleware of the contributing client device, whether contents of the message satisfy the set of constraints, wherein the determine comprises
compare a topic associated with the message with the one or more topics of messages that the contributing client device is authorized to contribute to the feed adapter; and
administer the message, by the messaging middleware of the contributing client device, in dependence upon whether the message satisfies the set of constraints.

15. The computer program product of claim 14 wherein the data communications environment comprises a data communications network, the network further comprising the feed adapter, the stream administration server, the at least one subscribing client device, the contributing client device, and no router.

16. The computer program product of claim 14 wherein the computer program instructions configured to administer the message comprises computer program instructions configured to:

authorize transmission of the message on the message stream in dependence upon whether the message satisfies the set of constraints; and transmit the message from the contributing client device to the feed adapter, bypassing the stream administration server, in response to an authorization of transmission of the message on the message stream.

17. The computer program product of claim 14 wherein the computer program instructions configured to administer the message comprises computer program instructions configured to log the message in dependence upon whether the message satisfies the set of constraints.

18. The computer program product of claim 14 wherein:

each constraint of the set of constraints is characterized by a message field identifier, a constraint value, and a constraint operator; and wherein the computer program instructions are configured to determinea, by the messaging middleware, whether contents of the message satisfy the set of constraints further comprises applying the constraint operator to the constraint value and to a value from a data field in the message identified by the message field identifier.

* * * * *